United States Patent [19]

Sugaya et al.

[11] Patent Number: 5,708,651

[45] Date of Patent: Jan. 13, 1998

[54] OPTICAL DISK HAVING REDUCED TRACK PITCH AND OPTICAL DISK PLAYBACK APPARATUS CONTAINING THE SAME

[75] Inventors: Toshihiro Sugaya, Ibaraki-ken; Yoshinori Honguh, Yokohama, both of Japan

[73] Assignee: Kabushiki Kaisha Toshiba, Kawasaki, Japan

[21] Appl. No.: 738,656

[22] Filed: Oct. 30, 1996

Related U.S. Application Data

[63] Continuation of Ser. No. 475,494, Jun. 7, 1995, Pat. No. 5,592,464, which is a continuation of Ser. No. 304,849, Sep. 13, 1994, Pat. No. 5,459,712.

[30] Foreign Application Priority Data

Jan. 19, 1994 [JP] Japan .................................. 6-004230
Mar. 29, 1994 [JP] Japan .................................. 6-002934

[51] Int. Cl.$^6$ .................................................. G11B 7/24
[52] U.S. Cl. .............................. 369/275.4; 369/275.3
[58] Field of Search .......................... 369/275.4, 275.2, 369/275.3, 275.1, 13, 112, 110–111, 109, 288, 286, 284, 44.26, 124, 100; 360/114, 59

[56] References Cited

U.S. PATENT DOCUMENTS

| | | | |
|---|---|---|---|
| 4,587,648 | 5/1986 | Ando | 369/275.4 |
| 4,734,904 | 3/1988 | Imanaka | 369/109 |
| 5,060,223 | 10/1991 | Segawa | 369/275.4 |
| 5,107,486 | 4/1992 | Inui | 369/275.4 |
| 5,216,665 | 6/1993 | Imataki | 369/279 |
| 5,274,623 | 12/1993 | Usami | 369/275.1 |
| 5,459,712 | 10/1995 | Sugaya et al. | 369/275.4 |
| 5,592,464 | 1/1997 | Sugaya et al. | 369/275.4 |
| 5,602,825 | 2/1997 | Sugaya et al. | 369/275.4 |

FOREIGN PATENT DOCUMENTS

| | | |
|---|---|---|
| 0132137 A2 | 1/1985 | European Pat. Off. . |
| 0553541 A1 | 8/1993 | European Pat. Off. . |
| 0553573 A1 | 8/1993 | European Pat. Off. . |

OTHER PUBLICATIONS

Jozef Braat, Principles of Optical Disc Systems, Ch.2, "Read–out of Optical Discs", Sec. 2.2.3, 1985, pp. 17–19.
Terao et al, Fundamentals of Optical Memory, "Recordable and Erasable Optical Memory Medium", 1990, pp. 60–61.
K. Yamada et al, "Tracking Method for Optical Disk Systems with Composite Detection", Abstracts of Lectures given at the 54th Meeting of the Japanese Society of Applied Physics Sep. 27, 1993, 28a–SF–16, p.1009.
Sugaya et al., "Performance of a 600 Mbyte 90 mm Phase–Change Optical Disk against Disk Tilt", Jpn. J. Appl. Phys., vol. 32 (1993), pp. 5402–5405.

*Primary Examiner*—Ali Neyzari
*Attorney, Agent, or Firm*—Cushman, Darby & Cushman IP Group of Pillsbury Madison & Sutro LLP

[57] ABSTRACT

An optical disk comprises a substrate, and a recording layer which is formed on the substrate and on which information is recorded at specific pitches in the form of pit trains, wherein the information is reproduced by projecting a light beam via an object lens, and when the wavelength of the light beam is $\lambda$ μm and the numerical aperture of the object lens is NA, the track pitch is set in the range of $(0.72$ to $0.8) \times \lambda/NA/1.14$ μm, and each of the pits has a trapezoid cross section whose upper width is in the range of $(0.3$ to $0.5) \times \lambda/NA/1.14$ μm and whose lower width is in the range of $(0.2$ to $0.32) \times \lambda/NA/1.14$ μm or whose inner wall has an angle of 30° to 70°.

8 Claims, 15 Drawing Sheets

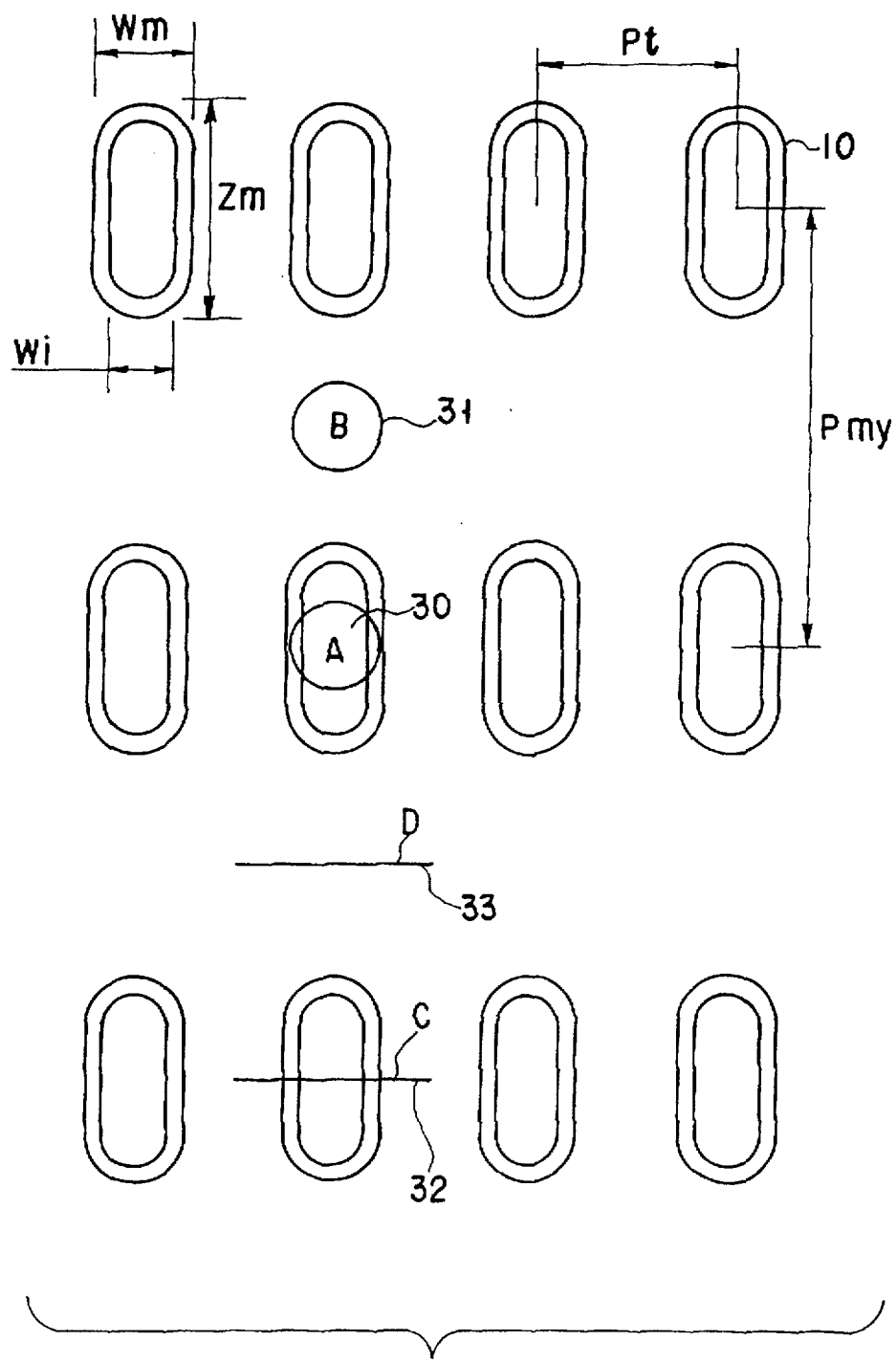
F I G. 3

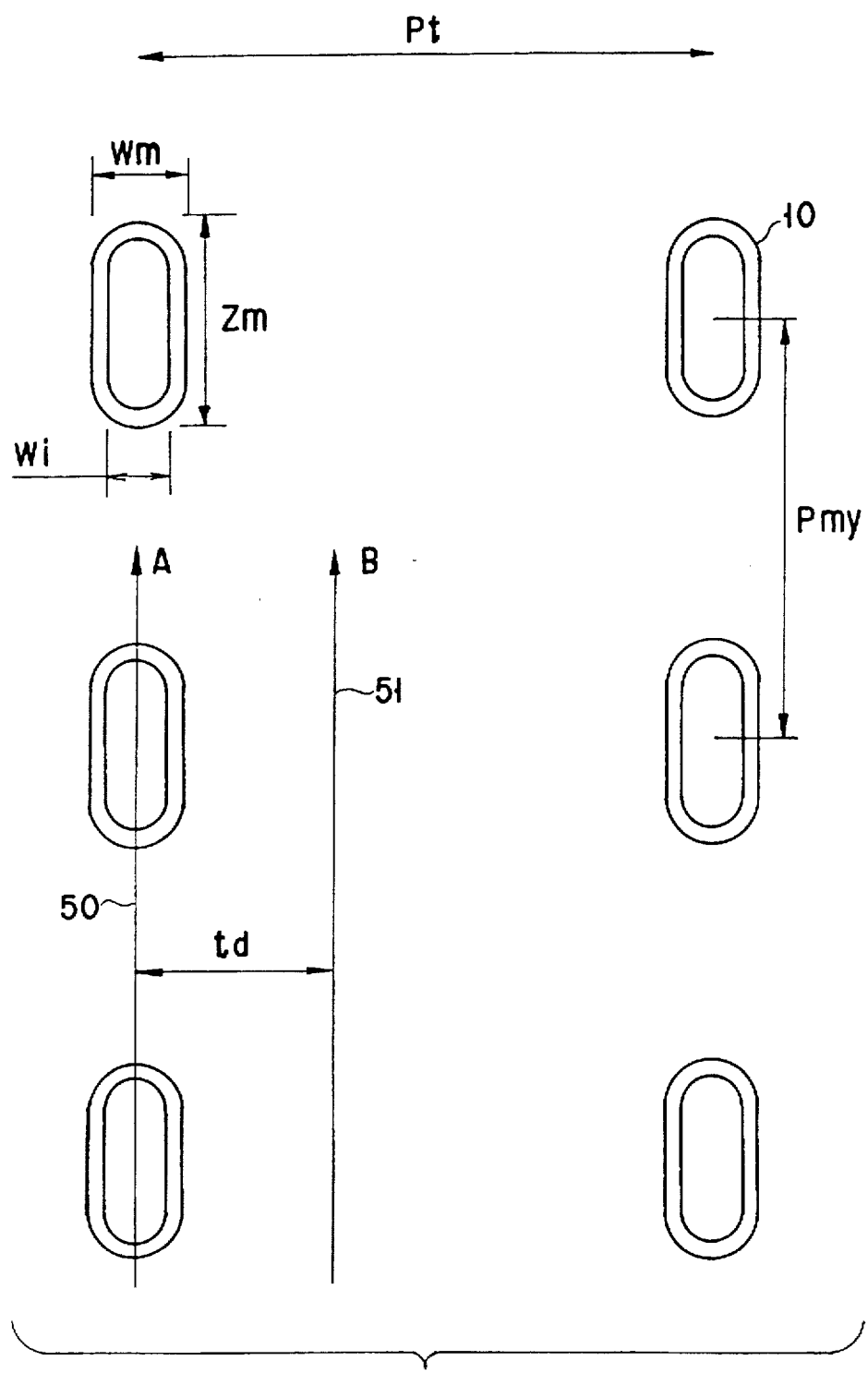
F I G. 5

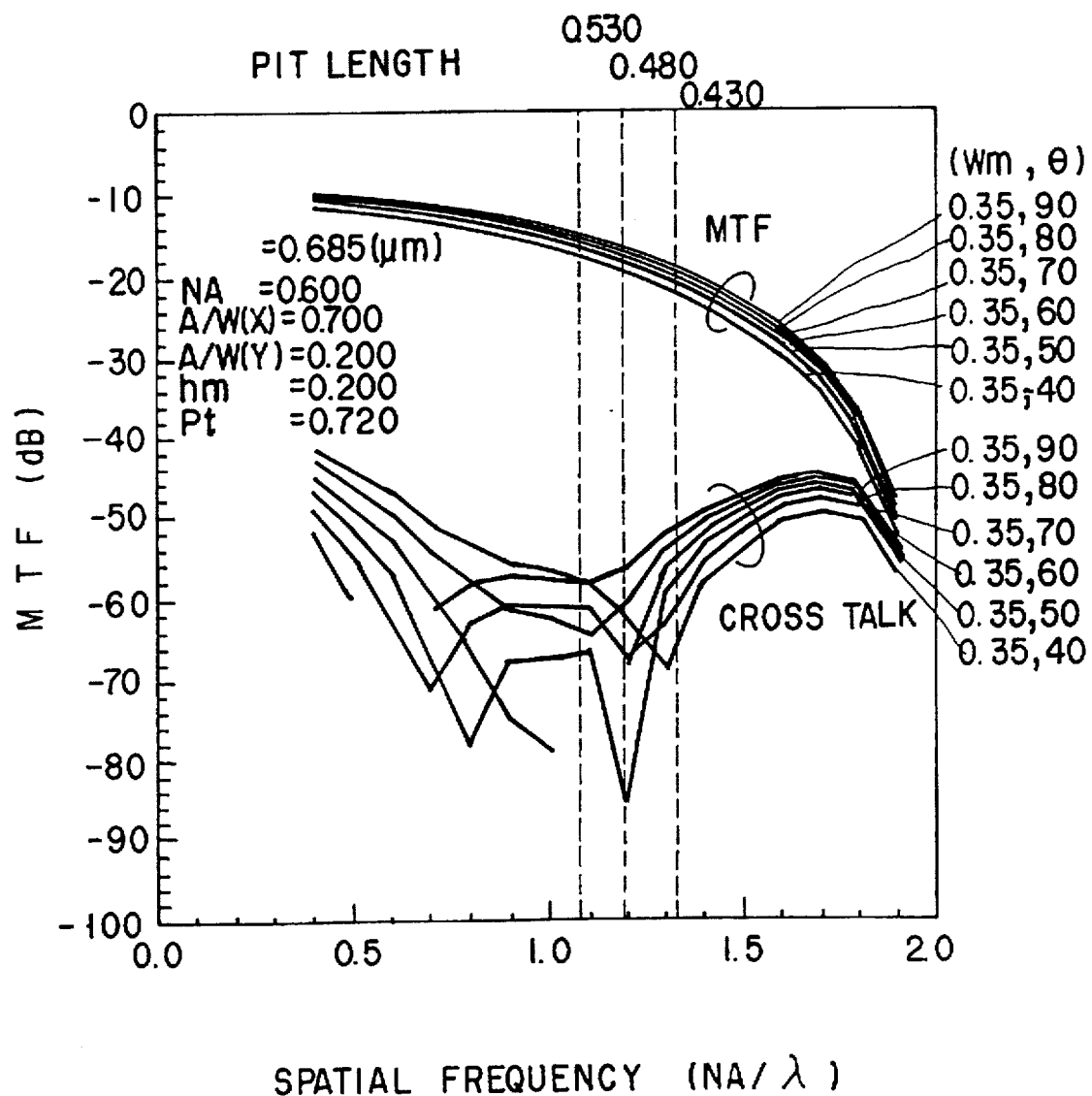
F I G. 9

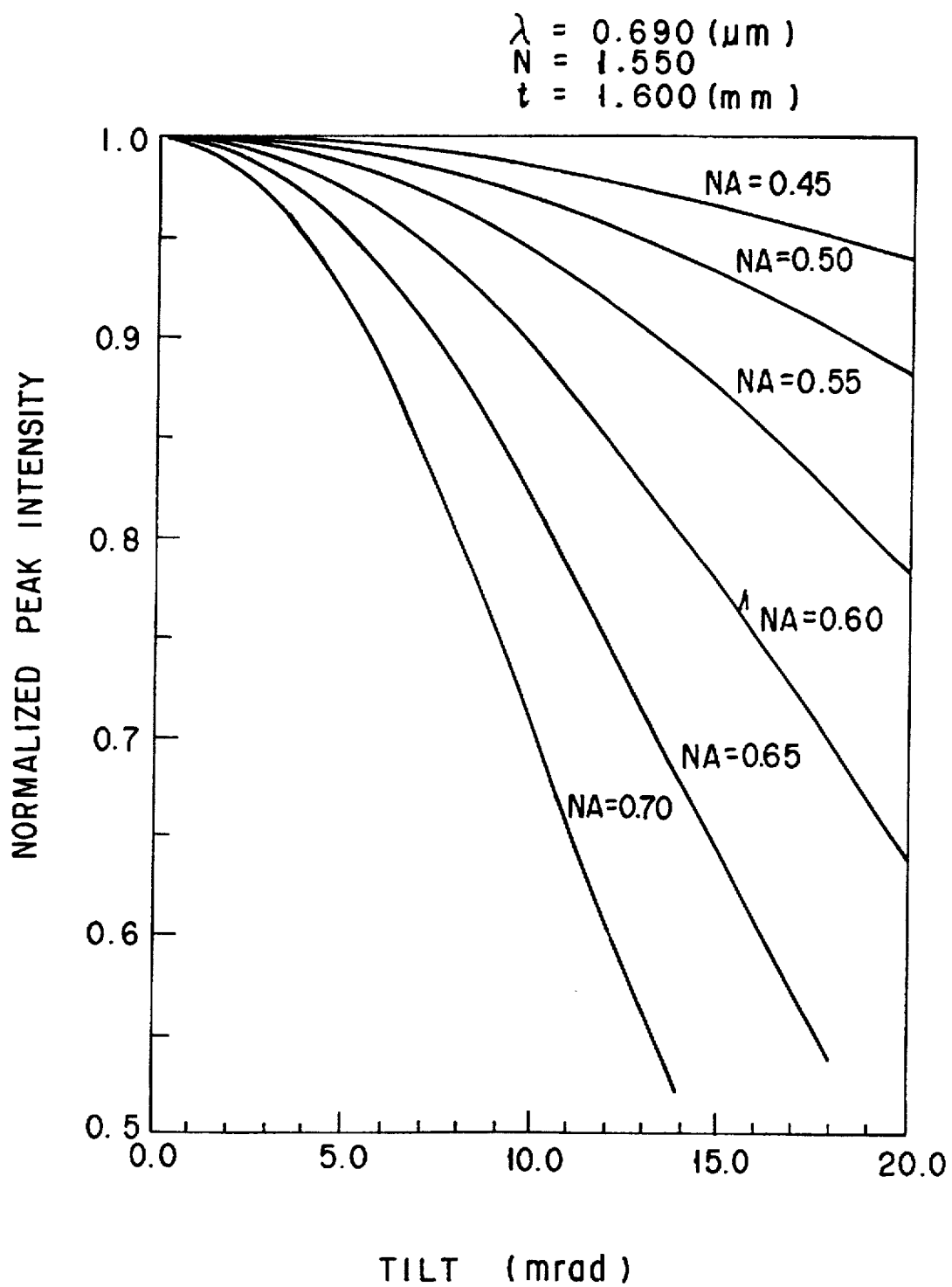
F I G. 12

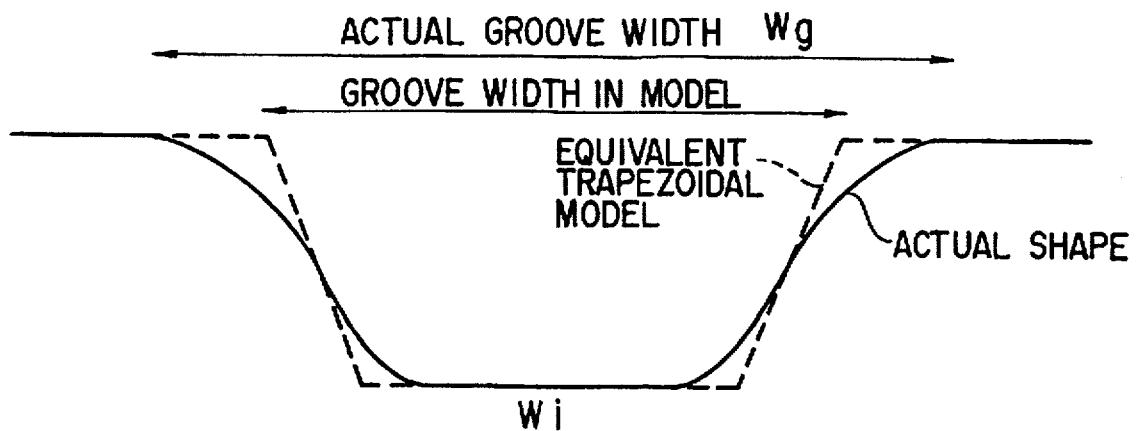
F I G. 13
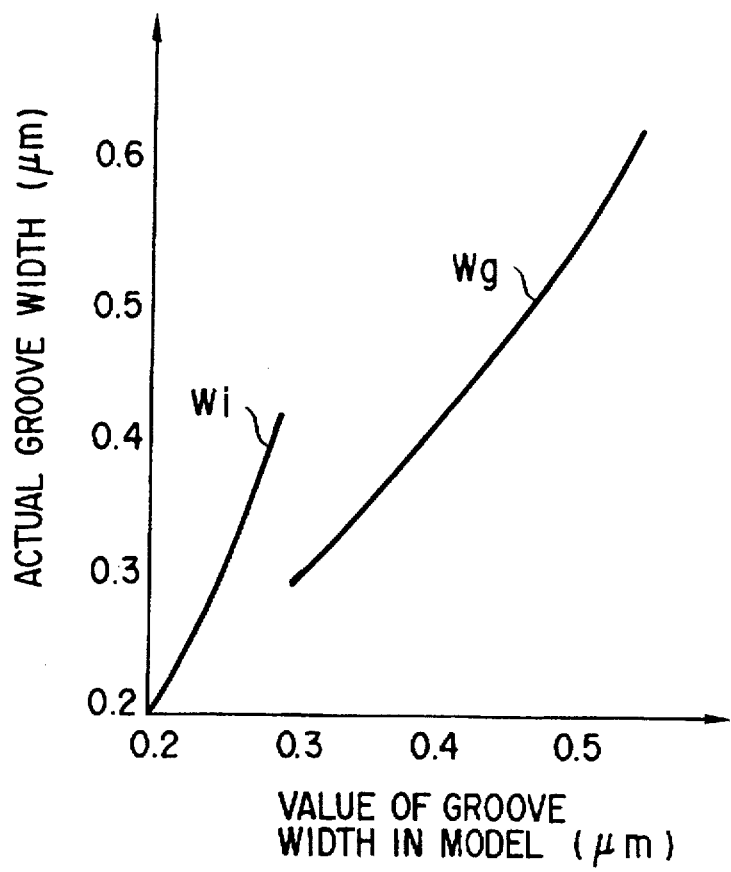
F I G. 14

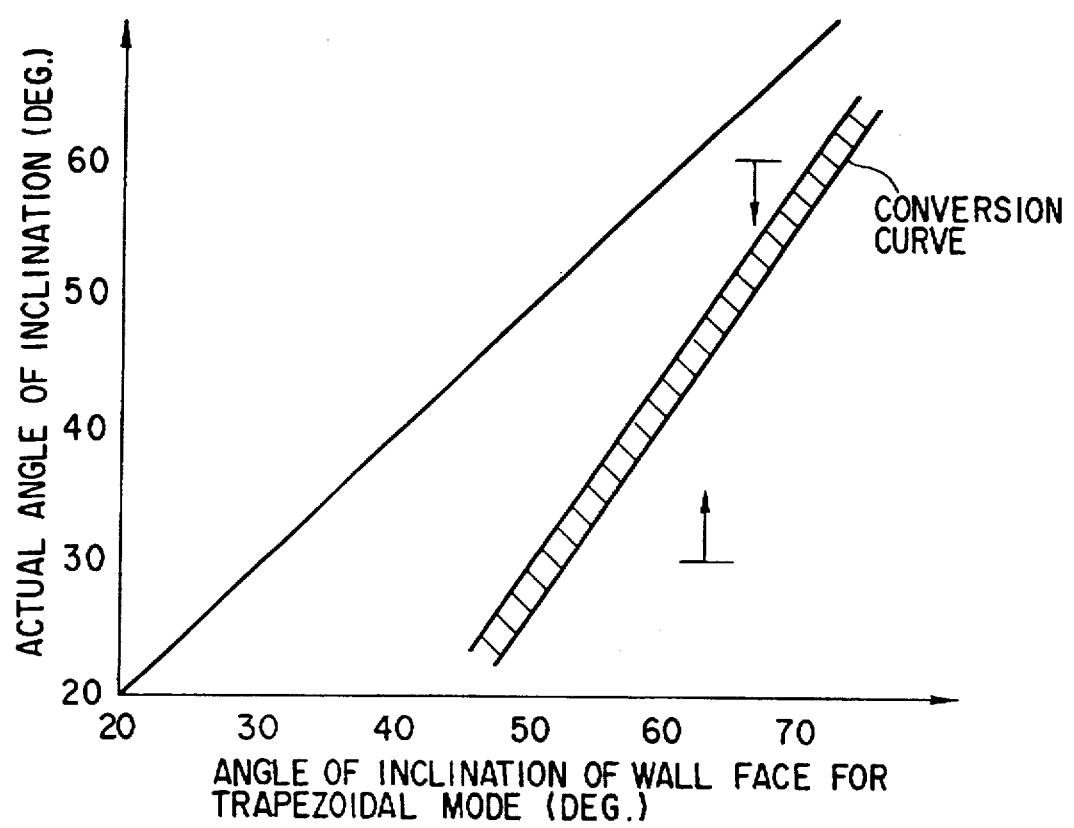
F I G. 15

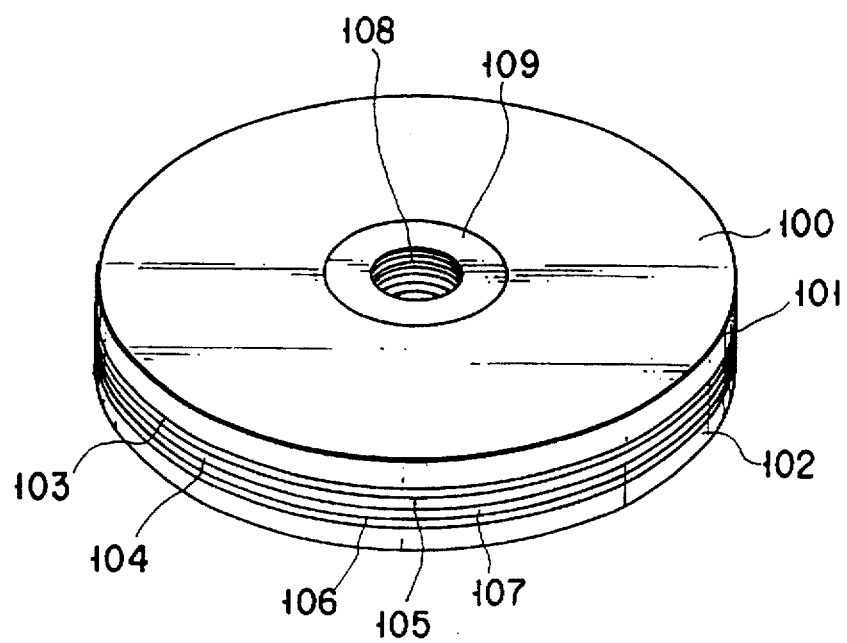
F I G. 16A
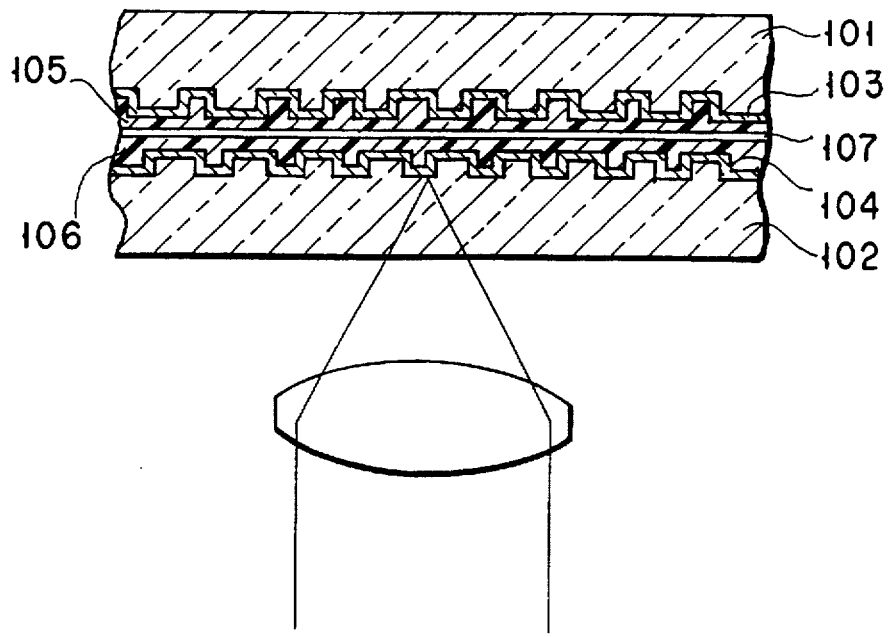
F I G. 16B

OPTICAL DISK HAVING REDUCED TRACK PITCH AND OPTICAL DISK PLAYBACK APPARATUS CONTAINING THE SAME

This is a continuation of application Ser. No. 08/475,494, filed Jun. 7, 1995, now U.S. Pat. No. 5,592,464, which is a continuation of 08/304,849, filed Sep. 13, 1994, now U.S. Pat. No. 5,459,712.

BACKGROUND OF THE INVENTION

1. Field of the Invention

This invention relates to an optical disk on which information is recorded in pits with high density and an optical disk apparatus containing the optical disk and a playback optical system.

2. Description of the Related Art

With the recent advances in image digital signal processing techniques and moving-picture compression techniques, the latter of which have been developed by such a standardizing organization as the MPEG (Moving Picture image Coding Experts Group), there is a growing expectation of the advent of an optical disk capable of reproducing moving-picture information such as a movie for two hours and being the same size as a CD (compact disk) in place of a VTR or laser disk. The recording capacity required to record two hours of moving-picture information in the form of analog video signals by a standard TV system such as NTSC as on the laser disk, amounts to 80 Gbyte including sound. Use of moving-picture compression techniques prescribed by a standardized method called MPEG-2, for example, requires as small a capacity as nearly 4 Gbyte even for a picture quality as good as a high picture-quality VTR such as S-VHS. The 4-Gbyte disk has been put into practical use in the form of a 300-mm diameter write-once read-many optical disk. As more and more optical disks will be used in homes in the future, it is needed to achieve an easy-to-use 120-mm diameter disk which has the same size and almost the same capacity as the CD.

The capacity of the CD format presently available as the music CD or the CD-ROM is 790 Mbyte at the maximum (when the linear velocity is 1.2 m/s). The capacity of this order can store only 24 minutes of compressed moving-picture information by MPEG-2. Thus, to store two hours of compressed moving-picture information by MPEG-2 with the CD size, the recording density must be made five times as high as that of the CD. In the current CD format, the substrate thickness is 1.2 mm, the track pitch is 1.6 μm, the pit pitch is 1.66 μm when the linear velocity (relative velocity between light beam and disk=disk's circumferential velocity) is 1.2 m/s, the bit length is 0.59 μm, and the modulation method is EFM (eight to fourteen modulation). In the playback optical system, the playback semiconductor laser, or the laser diode (LD) has a wavelength of 780 nm, the object lens has an NA (numerical aperture) of 0.45, and the beam spot has a diameter of 1.4 μm. The beam spot diameter is selected mainly from the standpoint of avoiding the effect of crosstalk between adjacent tracks.

To increase the recording density of the optical disk requires techniques for forming small pits in the disk and those for making the beam spot size small the optical disk in the playback optical system. Concerning techniques for forming pits, for example, an optical disk matrix recording technique using Kr ion laser light (ultraviolet rays) with a wavelength of 351 nm has been proposed (The 1993 Autumn National Convention of the Applied Physics Society, 28-SF-2). This technique makes it possible to form smaller pits than a conventional Ar ion laser. In the playback optical system, by making the wavelength of the playback laser beam shorter and increasing the NA, the beam spot diameter can be made smaller. Actually, however, with conventional techniques used in CD players, even if a short wavelength light source such as a red laser diode were used, the capacity would be increased by 1.5 times at most. With such an increase in the capacity, it cannot be expected to increase the capacity by five times that of an ordinary CD, which is what is required to record two hours of compressed moving-picture information.

As described above, with the conventional optical disk techniques, to avoid the problem of crosstalk between adjacent tracks, the track pitch and pit pitch are set larger than the beam spot diameter of the playback light beam. As a result, only by making the wavelength of playback light beam shorter and increasing the NA of the object lens, the recording density cannot be raised to the extent that the capacity required to store two hours of compressed moving-picture information by MPEG2 with the CD size, for example.

SUMMARY OF THE INVENTION

The object of the present invention is to provide an optical disk and an optical disk apparatus which can lessen crosstalk between adjacent tracks to the extent that there is no problem in practical use, even if the track pitch and pit pitch are smaller than the beam spot diameter of the playback light beam, and which achieves a higher density and a greater capacity than in the prior art.

According to the present invention, there is provided an optical disk comprising a substrate and a recording layer which is formed on the substrate and on which information is recorded at specific pitches in the form of pit trains, wherein the information is reproduced by projecting a light beam via an objective lens, and when the wavelength of the light beam $\lambda$ μm and the numerical aperture of the objective lens is NA, the track pitch is set in the range of (0.72 to 0.8)×$\lambda$/NA/1.14 μm. Each of the pits has a trapezoidal cross section whose upper width is in the range of (0.3 to 0.5)×$\lambda$/NA/1.14 μm and whose lower width is in the range of (0.2 to 0.32)×$\lambda$/NA/1.14 μm.

According to the present invention, there is provided an optical disk apparatus comprising an optical disk comprising a substrate and a recording layer which is formed on the substrate and on which information is recorded at specific pitches in the form of pit trains, an objective lens provided so as to face the optical disk, means for projecting a light beam onto the optical disk via the object lens, and means for sensing the reflected light of the light beam projected on the optical disk by the projecting means to reproduce the information recorded on the optical disk, wherein when the wavelength of the light beam is $\lambda$ μm and the numerical aperture of the objective lens is NA, the track pitch is set in the range of (0.72 to 0.8)×$\lambda$/NA/1.14 μm. Each of the pits has a trapezoid cross section whose upper width is in the range of (0.3 to 0.5)×$\lambda$/NA/1.14 μm and whose lower width is in the range of (0.2 to 0.32)×$\lambda$/NA/1.14 μm.

According to the present invention, there is provided an optical disk comprising a substrate and a recording layer which is formed on the substrate and on which information is recorded at specific pitches in the form of pit trains, wherein the information is reproduced by projecting a light beam via an object lens, and when the wavelength of the light beam is $\lambda$ μm and the numerical aperture of the object lens is NA, the track pitch is set in the range of (0.72 to 0.8)×λ/NA/1.14 µm. Each of the pits has a trapezoid, cross section whose upper width is in the range of (0.3 to 0.5)×λ/NA/1.14 µm and whose inner wall has an angle of 30° to 70°.

According to the present invention, there is provided an optical disk apparatus comprising an optical disk comprising a substrate and a recording layer which is formed on the substrate and on which information is recorded at specific pitches in the form of pit trains, an objective lens provided so as to face the optical disk, means for projecting a light beam onto the optical disk via the objective lens, and means for sensing the reflected light of the light beam projected on the optical disk by the projecting means to reproduce the information recorded on the optical disk. When the wavelength of the light beam is λ µm and the numerical aperture of the object lens is NA, the track pitch is set in the range of (0.72 to 0.8)×λ/NA/1.14 µm. Each of the pits has a trapezoidal cross section whose upper width is in the range of (0.3 to 0.5)×λ/NA/1.14 µm and whose inner wall has an angle of 30° to 70°.

By setting various parameters of the pit shape at the above-described values, the amount of crosstalk between adjacent tracks is suppressed to less than −20 dB, which must be met to restore the original information from the reproduced signal, and the playback signal level and the level of the push-pull signal for tracking are maintained sufficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagrammatic view of the pit arrangement on the optical disk for calculating the levels of the playback and push-pull signals sensed from the optical disk;

FIG. 5 is a diagrammatic view of the pit arrangement on the optical disk used to evaluate the MTF of the playback optical system and crosstalk between adjacent tracks;

FIG. 9 shows the dependence of the playback optical system's MTF and the characteristics of crosstalk between adjacent tracks on the pit shape when the conditions are the same as in FIG. 8 except that the upper width Wm of pot 10 is fixed at 0.35 µm;

FIG. 12 shows the dependence of the NA of the object lens on the tilt when an optical disk whose substrate thickness is 0.6 mm is used;

FIG. 13 shows a cross sectional outline of an actual pit;

FIG. 14 shows a relationship between the groove width of an actual pit and the groove width of a model pit;

FIG. 15 shows a relationship between between an angle of inclination of an actual pit and that of a model pit;

FIGS. 16A and 16B are a perspective view and a sectional view of an optical disk according to an embodiment of the present invention.

DETAILED DESCRIPTION OF THE PREFERRED EMBODIMENTS

Before explanation of an embodiment, the basic concept of the present invention will be described.

To make the density of an optical disk higher, the spot diameter of the playback light beam must be made smaller. To do this, it is essential to make the wavelength of the playback laser diode shorter and increase the NA of the objective lens. Laser diodes (self-pulsation-type laser diodes) of a low-noise type whose wavelength is 0.685 µm and whose output is several milliwatts have already been put into practical use. Laser diodes whose wavelength is 0.650 µm are getting close to practical use.

The NA of the objective lens is limited by ease of making a lens and the tilt angle between the lens and the disk. The smaller the lens load (the thinner the optical disk substrate, the smaller the lens load) and the smaller the NA, the easier it is to make the object lens. For an objective lens whose NA is nearly 0.6, it is possible to make the beam spot diameter smaller even with a single nonspherical lens. However, with an objective lens used in the playback optical system for the optical disk, coma aberration occurs due to the tilt between the optical disk and the playback light beam caused by the tilt of the optical disk or the tilt of the optical axis of the objective lens.

Specifically, an attempt to make the NA of the objective lens larger in order to make the spot size of the playback light beam smaller permits the aberration of the object lens to increase sharply due to the tilt between the optical disk and the playback light beam. As the aberration of the object lens becomes larger, the amount of crosstalk between adjacent tracks increases accordingly, and the playback resolving power decreases. The thinner the optical disk substrate, the smaller the effect of the tilt. In the Japanese Journal of Applied Physics, Vol. 32 (1993), pp. 5402–5405, changes in the shape of the spot of the playback light beam corresponding to the tilt when the substrate thickness is 1.2 mm, the same as the CD, and 0.6 mm, with a wavelength of 0.690 µm and NA=0.6 are explained. According to this description, when the substrate thickness is 1.2 mm, a tilt of 5 mrad lowers the center strength of the beam spot as much as 10% and causes a rise in the side lobe and aberration, which contributes to crosstalk. In contrast, when the substrate thickness is 0.6 mm, the substrate can withstand the tilts ranging up to 10 mrad.

Figure 11:
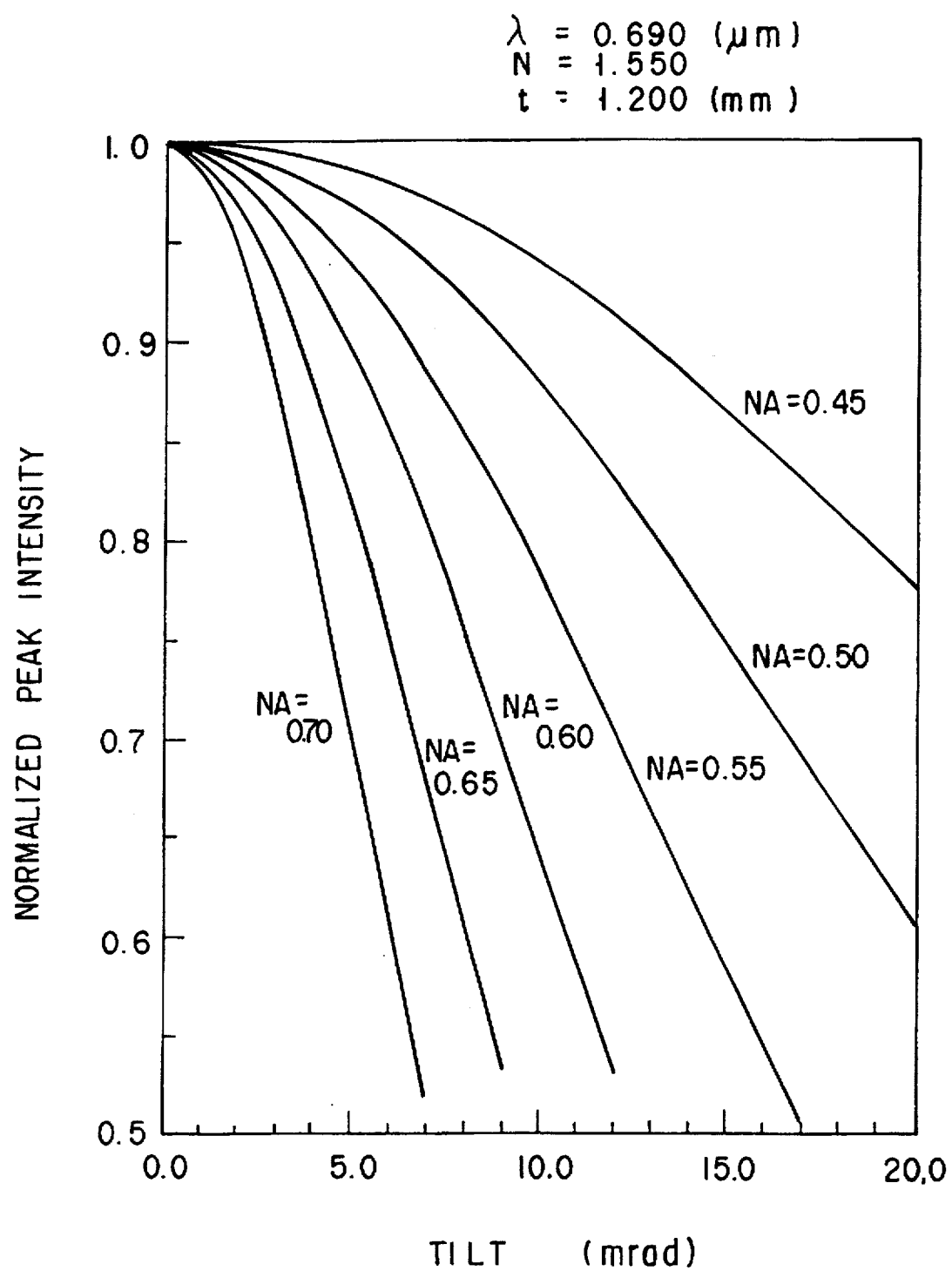
FIG. 11 shows the dependence of the NA of the object lens on the tilt when an optical disk whose substrate thickness is 1.2 mm is used.

FIGS. 11 and 12 show the results of calculating the tilt characteristics when the substrate thickness (t) is 1.2 mm and 0.6 mm, respectively, and using the NA as a parameter. The abscissa represents the angle of tilt and the ordinate indicates the normalized peak intensity of the playback signal. The wavelength (λ) of the playback light beam is assumed to be 0.690 µm. With the substrate thickness being 0.6 mm and the NA=0.6, the tilt is 9.5 mrad and the peak intensity of the playback signal decreases by 10%. When the substrate thickness is 1.2 mm, the NA=0.49. Specifically, by changing the substrate thickness from 1.2 mm (the conventional CD's thickness) to 0.6 mm, the NA can be increased from 0.49 to 0.6, and consequently the surface recording density can be increased by 1.5 times. Because the spot size is proportional to λ/NA and the surface recording density is proportional to $\frac{1}{2}^2$ of the spot size, this gives $(0.6/0.49)^2$, which means that the area recording density is 1.5 times as high as that of the conventional CD.

However, just making the substrate thickness thinner can cause the substrate to warp substantially due to temperature or humidity. The warp of the substrate contributes mainly to the tilt. To avoid this, it is most effective to make the optical disk double-sided as the laser disk, or to give the optical disk a symmetrical structure with respect to the front and back. In that case, it is possible to record information on both sides with a single-structure optical disk like the conventional CD, since an aluminum reflective film or protective film is formed on one side of the substrate, the substrate has an asymmetrical moisture absorption with respect to the front and back, and thus tends to warp easily. A double-sided optical disk cancels the distortion of the substrate due to moisture absorption, thereby preventing a large tilt from occurring.

The evaluation results described above show that if a combination of a laser diode with a wavelength of 0.685 µm, a 0.6-mm thick substrate, and an objective lens with an NA=0.6 are used, the wavelength will be shortened from 0.780 µm to 0.685 µm and the NA will grow larger from 0.45 to 0.6, so that the recording density can be made about 2.3 times as large as that of the conventional CD format even by conventional CD design techniques. Specifically, because the spot size is proportional to λ/NA, this gives (0.685/0.6)/(0.780/0.45), meaning that the recording density is about 2.3 times as high as that of the conventional CD. However, to achieve the capacity required to record two hours of compressed moving-picture information by MPEG2 with the CD size, it is necessary to make the recording density (capacity) about five times as large as that of the conventional CD format.

According to the present invention, there is provided an optical disk which enables the track pitch to be made much smaller in order to achieve a much higher density and greater capacity, while assuring the low crosstalk characteristics and the sufficient signals levels of the playback signal and the push-pull signal by optimizing the pit shape of the same beam spot size as described above. Hereinafter, the pit shape in the present invention will be described in detail.

Figure 1:
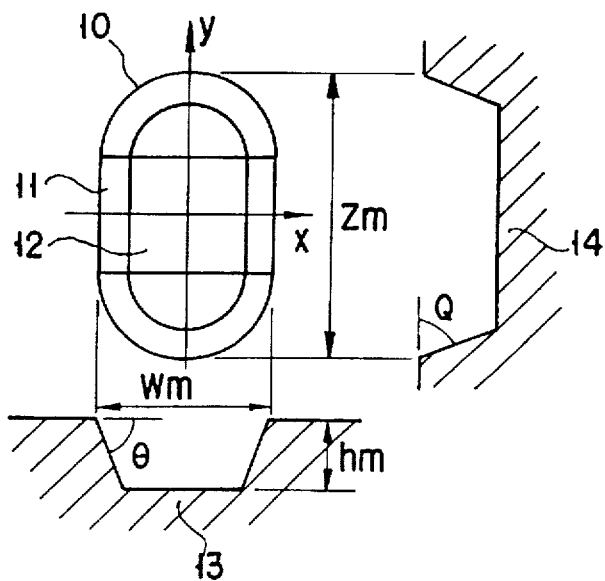
FIG. 1 is a diagrammatic view to help explain the shape of a pit in an optical disk according to an embodiment of the present invention.

FIG. 1 is an explanatory diagram of the shape of a pit in an optical disk according to the present invention. As shown in the figure, the shape of a pit 10 is approximated by a shape with a trapezoidal cross section. The inner wall 11 of the pit 10 is inclined downward and its bottom portion 12 is almost flat. Numeral 13 indicates the cross section of the pit 10 along the radius of the optical disk (the track width direction); 14 the cross section along the circumference of the optical disk (the track direction); Wm the size of the top of pit 10 across the track width (hereinafter, the upper width); Wi the size of the bottom of the pit 10 across the track width (hereinafter, the lower width); hm the depth of the pit 10, Zm the length of the pit 10 along the track; and θ represents the angle of the inner wall of the pit 10 (the angle that the inner wall forms with respect to the surface of the optical disk).

Figure 2:
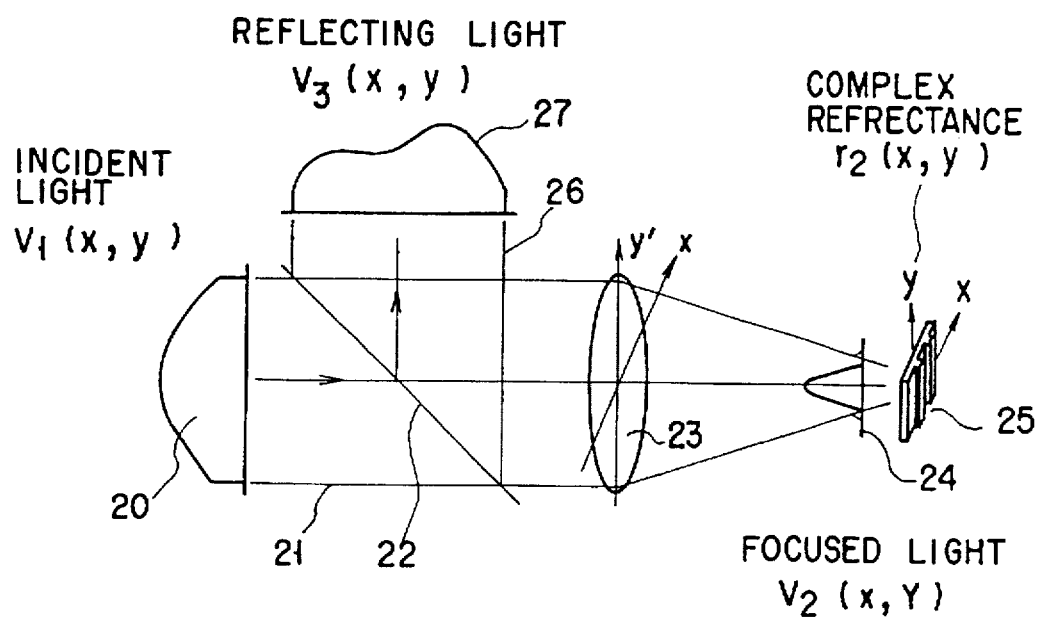
FIG. 2 is a schematic diagram of the playback optical system in an optical disk apparatus.

FIG. 2 shows a model of the playback optical system of the optical disk apparatus used in the analysis. The figure shows the incident light distribution 20 (V1 (x,y)) of playback light beam, incident light 21, a polarization beam splitter (or half mirror) 22 for separating the incident light 21 from the reflected light 26, an objective lens 23 with a numerical aperture of NA, the distribution 24 (V2(x,y)) of focused light (beam spot) by the object lens on the recording surface (pit surface) of the optical disk, an optical disk 25 with a complex reflectivity of r2(x,y), the reflected light 26, and the distribution 27 (V3(x,y)) of the reflected light 26 on a photosensor.

FIG. 3 diagrammatically shows the pit arrangement on the optical disk used to calculate the levels of the playback signal and the push-pull signal, where the track pitch (the pitch of a pit across the track width) is Pt and the pit pitch (the pit pitch along the track) is Pmy. The beam spots 30 and 31 of the playback light beam represent spot A at the center of a pit and spot B between pits, respectively. The amplitude of the playback signal is represented as |S(A)–S(B)|, where S(A) and S(B) indicate the output signals of the photosensor when the beam spot is positioned at (A) and (B), respectively. Lines 32 and 33 show the positions in which the push-pull signal (the difference signal between the output signals of the split photosensors arranged along the track in at least two sensing areas) is obtained in an area (C) with pits and an area (D) without pits. Those push-pull signals each have the average p-p values in area C and area D.

Figure 4:
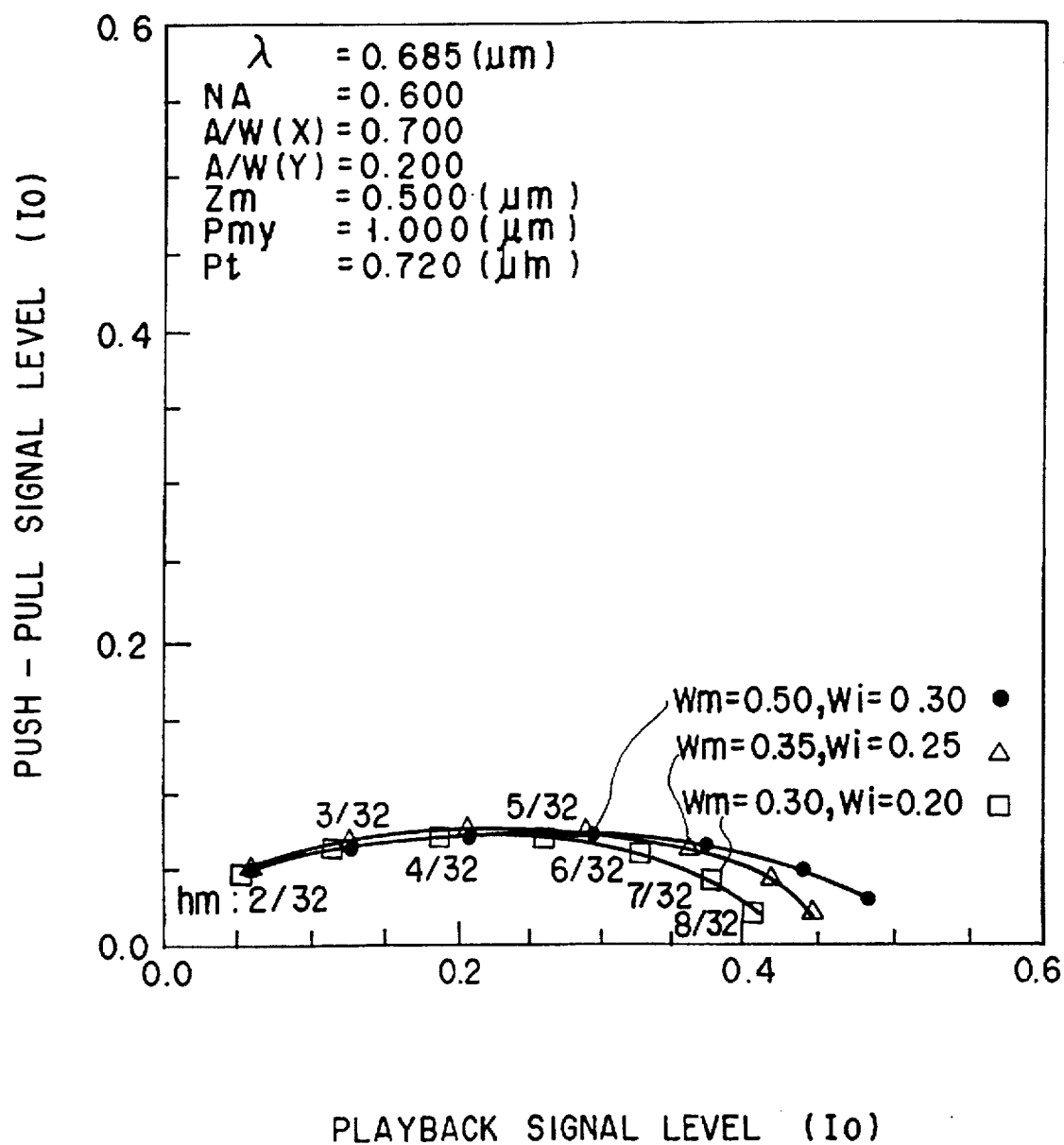
FIG. 4 shows the relationship between the playback signal level and the push-pull signal level obtained from calculations using the pit size in the track width direction and the pit depth as parameters.

FIG. 4 shows the results of calculating the levels of the playback signal and the push-pull signal using the size of a pit across the track width and the pit depth as parameters with a playback laser beam wavelength of 0.685 µm, NA=0.6, Zm=0.5 µm, Pmy=1 µm, and Pt=0.72 µm. The values of the beam filling factors A/W(X) and A/W(Y) of the playback light beam across the track width (X) and along the track (Y) are shown in the figure. As seen from the figure, the levels of the playback signal and the push-pull signal do not depend largely on the shape of a pit except the case where Wm=0.3 and Wi=0.2. There is no such pit depth as brings the levels of the playback signal and the push-pull signal to the maximum level simultaneously. To minimize a decrease in the push-pull signal level and obtain the maximum playback signal level, it is desirable from FIG. 4 that the pit depth should be approximately λ/5, preferably in the range of λ/4.2 to λ/5.2. More specifically, the pit has a depth in a range of 1/4.2×λ/n to 1/5.2×λ/n, where n is a refractive index of the substrate.

FIG. 5 diagrammatically shows an MTF of the playback optical system and the pit arrangement on the optical disk used to evaluate crosstalk between adjacent tracks. In the figure, the spots 50 and 51 of the playback light beam represent a spot at the center (A) of a pit and a spot passing through position (B) a distance of td away from the center of a pit. MTF is expressed by the power of the basic frequency component of the output signal from the photosensor obtained when the beam spot passes through the center of a pit. Crosstalk is expressed by the power of the basic frequency component of the output signal from the photosensor obtained when the beam spot passes through position B.

Figure 6:
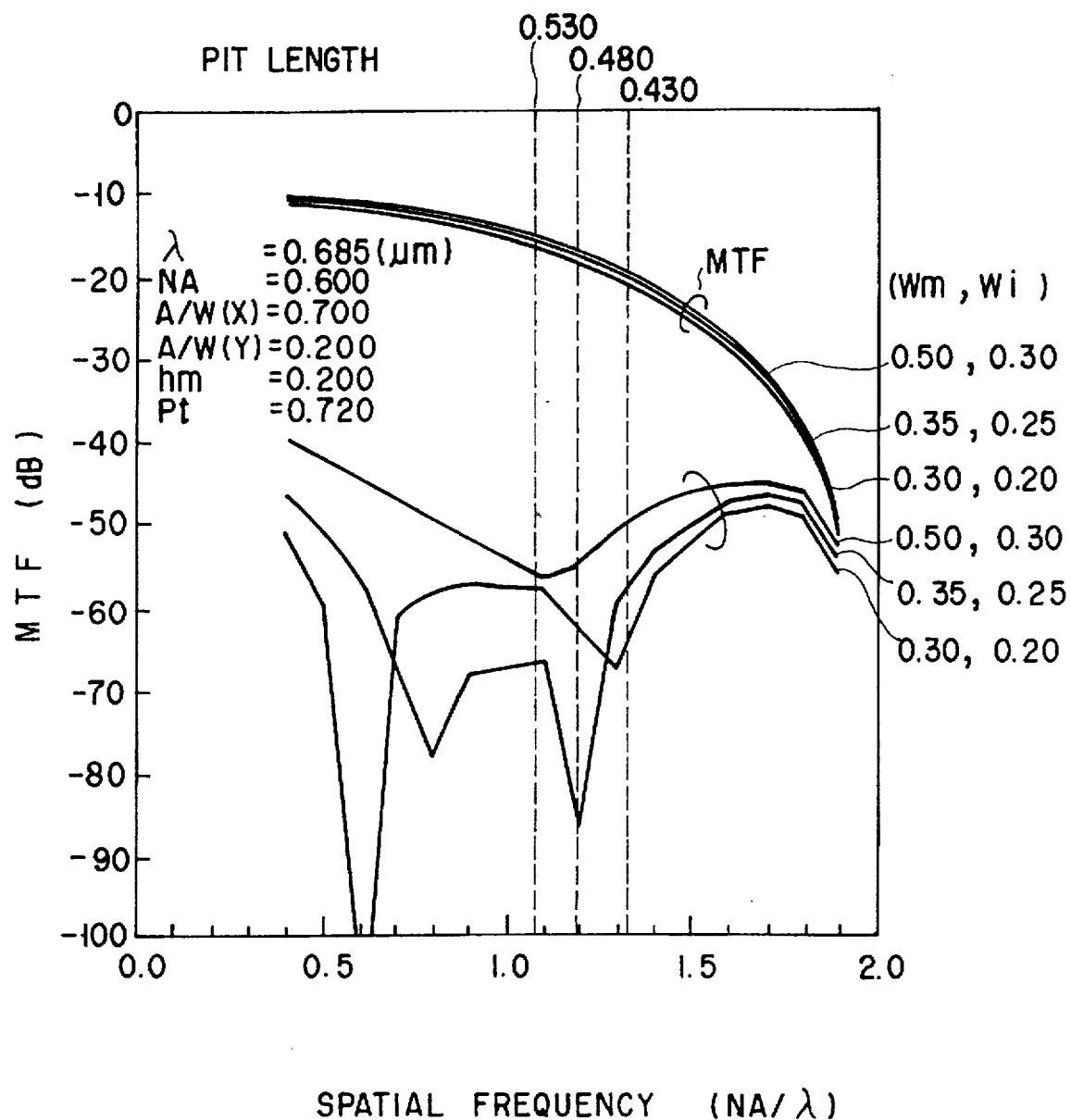
FIG. 6 shows the dependence of the playback optical system's MTF and the characteristics of crosstalk between adjacent tracks on the pit shape when the upper width Wm and lower width Wi of the pit are changed variously.

FIG. 6 shows the MTF and the crosstalk characteristics when the track pitch Pt is fixed at 0.72 μm, the depth hm of the pit 10 is fixed at 0.2 μm, and the upper width Wm and lower width wi of the pit 10 are changed variously, with the spatial frequency on the abscissa and MTF and crosstalk on the ordinate. The values of beam packing factors A/W(X) and A/W(Y) of the playback light beam across the track width (X) and along the track (Y) are shown in the figure. In the figure, the MTF produces a difference of 1 to 2 dB depending on the pit shape, which is not too large. In contrast, it can be seen that crosstalk changes greatly with the pit shape.

Figure 7:
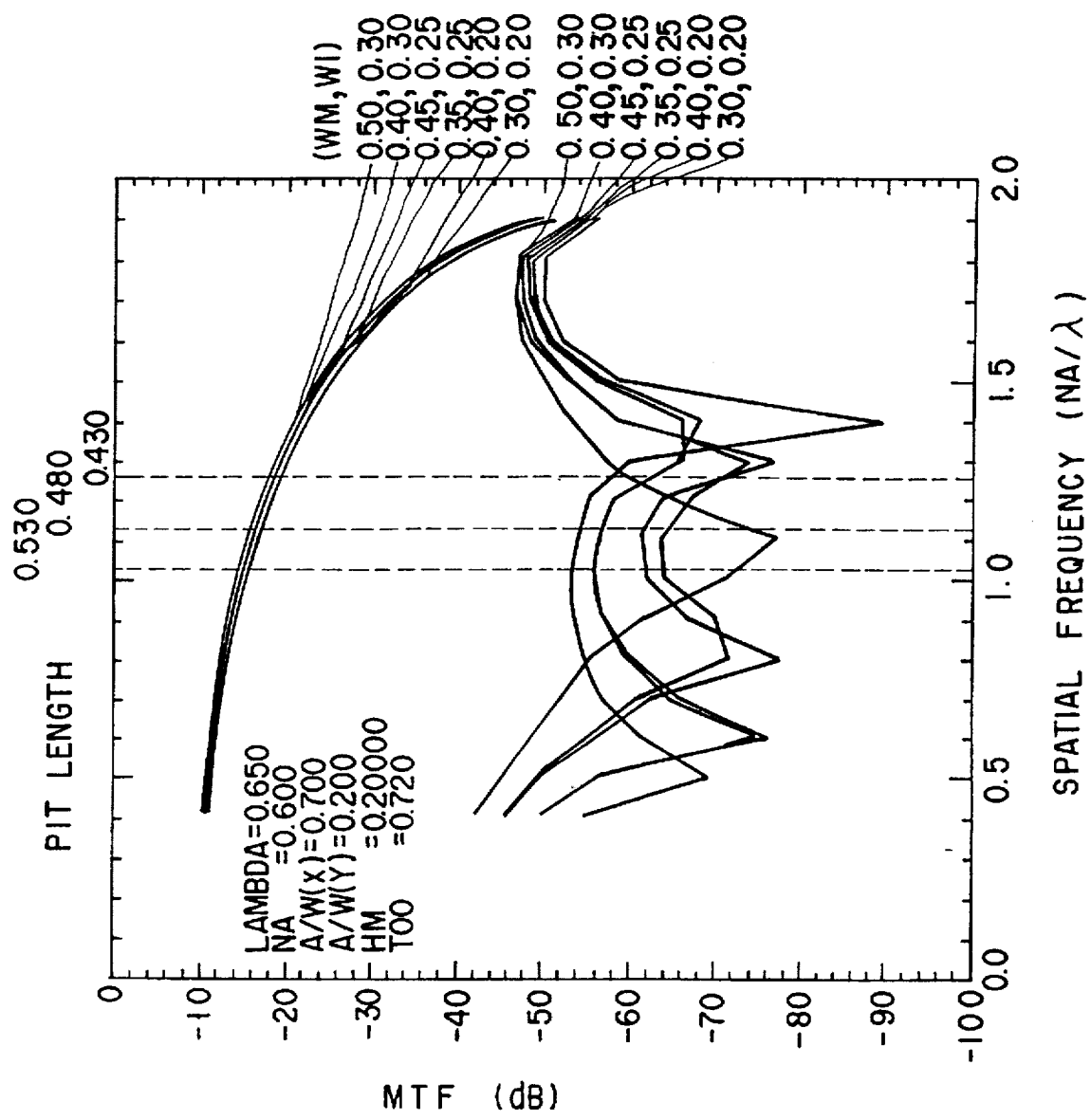
FIG. 7 shows the dependence of the playback optical system's MTF and the characteristics of crosstalk between adjacent tracks on the pit shape when the conditions are the same as in FIG. 6 except that λ is set at 0.650 µm.

FIG. 7 shows the MTF and the crosstalk characteristics under the same conditions as in FIG. 6 except that λ is set at 0.650 μm.

Figure 8:
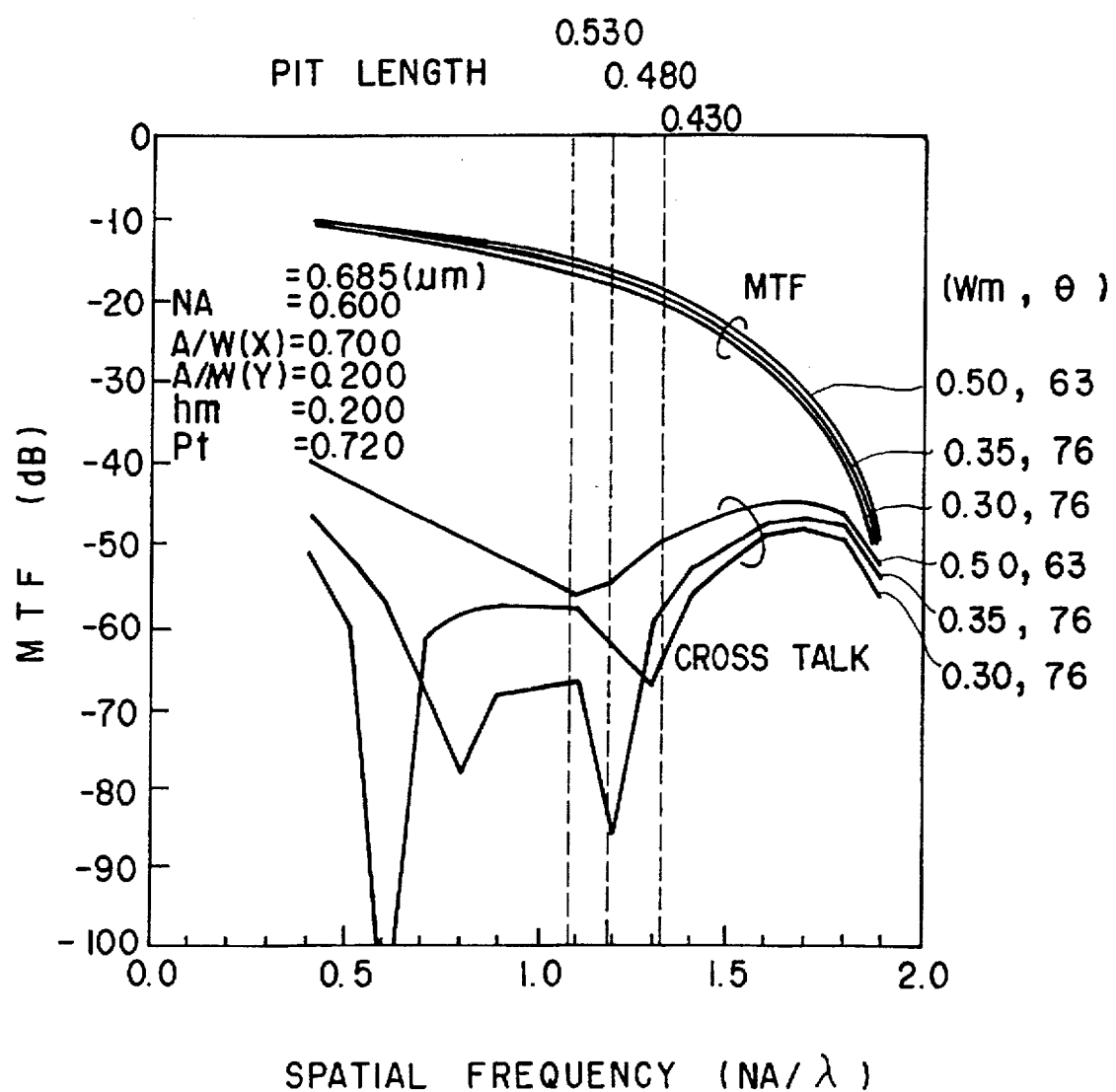
FIG. 8 shows the dependence of the playback optical system's MTF and the characteristics of crosstalk between adjacent tracks on the pit shape when the upper width Wm and the angle θ of the pit's inner wall are changed variously.

FIG. 8 shows the MTF and the crosstalk characteristics when the track pitch Pt is fixed at 0.72 μm, the depth hm of the pit 10 is fixed at 0.2 μm, and the upper width Wm and the angle θ of the inner wall 11 of the pit 10 are varied with the spatial frequency on the abscissa and MTF and crosstalk on the ordinate. The values of beam packing factors A/W(X) and A/W(Y) of the playback light beam across the track width (X) and along the track (Y) are shown in the figure.

FIG. 9 shows the MTF and the crosstalk characteristics under the same conditions as in FIG. 8 except that the upper width wm of the pit 10 is fixed at 0.35 μm and only the angle θ of the inner wall 11 of the pit 10 is varied.

Figure 10:
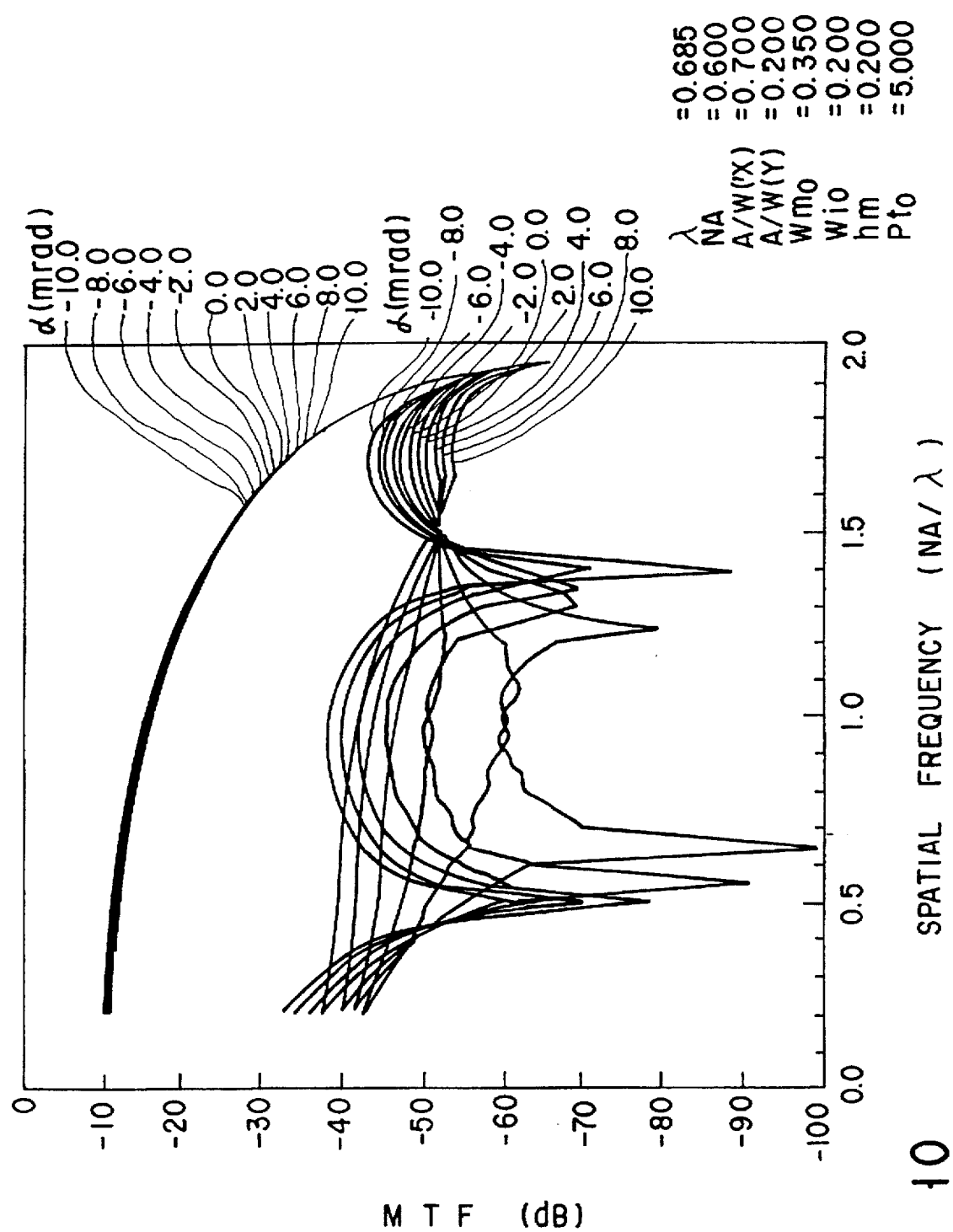
FIG. 10 shows the dependence of the playback optical system's MTF and the characteristics of crosstalk between adjacent tracks on the tilt.

It is assumed that the 4/9 modulation method, whose efficiency is higher than that of EFM used in the conventional CD, and the (3, 17) RLL (Run-Length Limited) method are used as a modulation method of information recorded on the optical disk. This is a coding method of converting the 4-bit original information into 9 bits and limiting the number of consecutive 0s to between 3 and 17. The density ratio is improved by 20% as compared with EFT including DCC. In this case, if the shortest pit length is 0.48 μm, the maximum pit length will be 2.16 μm. Therefore, it is necessary to pay attention to crosstalk due to low frequency components when the longest pit is sensed. Although the crosstalk characteristics shown in FIGS. 6 to 9 are for no tilt, tilts actually have to be taken into account. FIG. 10 shows the MTF and the crosstalk characteristics when tilts are taken into account. As can be seen from the figure, when tilts are taken into account, the MTF almost remains unchanged, but the amount of crosstalk increases, and the conditions for determining the parameters of a pit become more strict.

In the system design of an optical disk apparatus, if a tilt due to the warp of the optical disk itself and a tilt due to the apparatus are considered to be 5 mrad and 3 mrad, respectively, a tilt of about 8 mrad in total must be tolerated. According to the simulation in FIG. 10, the amount of crosstalk can be suppressed to values less than −20 dB required in practical use in the tilt range of ±10 mrad for the same spatial frequency. This shows that a wavelength of 0.685 μm and a track pitch of 0.72 μm are reasonable.

The evaluation of FIGS. 6 to 9 shows that the amount of crosstalk (the difference in MTF value between the MTF characteristic and the crosstalk characteristic) is 20 dB or less until Wm=0.45 μm in the case where the track pitch shown in FIGS. 6 and 8 is 0.72 μm. In contrast, when Wm=0.5 μm, the amount of crosstalk at low frequencies increases rapidly, exceeding −20 dB. The MTF characteristics are relatively good until Wm=0.3 μm, but deteriorates sharply when Wm is less than 0.3 μm. Therefore, the range of Wm=0.3 μm to 0.45 μm is reasonable.

The results mentioned above show that when the pit shape across the track width is standardized with a wavelength of 0.685 μm and NA=0.6 (i.e., λ/NA=1.14), it is desirable that the upper width of a pit should be (0.3 to 0.45)×λ/NA/1.14 μm, and the lower width of the pit should be (0.2 to 0.25)×λ/NA/1.14 μm, or that the upper width Wm should be (0.3 to 0.45)×λ/NA/1.14 μm and the angle θ of the inner wall should be in the range of 50° to 70°. Specifically, when the track pitch Pt is selected in the range of (0.72 to 0.8)×λ/NA/1.14 μm and the track pitch is made smaller than the beam spot diameter of the playback light beam, selecting the upper width Wm and lower width wi of the pit or the upper width Wm of the pit and the angle θ of the inner wall in the above ranges enables the amount of crosstalk to be suppressed to values less than −20 dB required in practical use in the tilt range of ±10 mrad expected in an actual optical disk apparatus, thereby achieving a remarkable improvement in the recording density. As a result, by combining these track pitch and pit shape, the laser diode with a wavelength of 0.685 μm, for example, as mentioned earlier, the 0.6-mm thick substrate, the object lens with NA=0.6, the subject of recording two hours of compressed moving-picture information by MPEG with the CD size can be achieved easily.

The parameters used in the explanation of the invention are obtained through calculations on the assumption that the pit is in the form of an ideal trapezoid. Actually, however, the pit does not take the form of an accurate trapezoid, but curves at its corners as shown in FIG. 13. Therefore, the parameters for the ideally trapezoidal pit, or the model pit, differ from those for the actual pit. FIG. 14 shows the difference between the bottom groove width wi and the top groove width wg for the model pit and the actual pit. As seen from FIG. 14, the value of wi for the model pit ranges from 0.2 to 0.32 μm; the value of wg for the model pit ranges from 0.3 to 0.45 μm, whereas the value of wg for the actual pit varies from 0.3 to 0.5 μm. Furthermore, the angle of inclination θ of the pit is as follows. As shown in FIG. 15, an angle of inclination of the mode pit is in the range of 50° to 70°, whereas that of the actual pit in the range of 30° to 60°.

Hereinafter, the structure of an optical disk according to the present invention will be described. FIGS. 16A and 16B are a perspective view and sectional view of a double-sided optical disk 100, respectively. One surface of each of transparent substrates 101 and 102 is embossed with pits made of light-transmitting resin such as polycarbonate or acrylic resin and is coated with a reflecting film 103 and a reflecting film 104 (e.g., of aluminum), respectively. On these films, protective films 105 and 106 are formed. The thickness of the transparent substrates 101 and 102 is 0.6 mm. The transparent substrates 101 and 102, whose protective films 105 and 106 are allowed to face each other, are laminated together with an adhesion layer 107 with a thickness of several tens of μm made of a thermoset adhesive. In the center of the optical disk 100, a hole 108 is made for clamping. Around the hole, a clamping zone 109 is provided. A playback light beam 110 is emitted from a laser diode (not shown), passes through the playback optical system, enters an optical disk 100 via an object lens 111 from the transparent substrates 101 and 102, and is focused with a small beam spot on the reflecting films 103 and 104.

Figure 17:
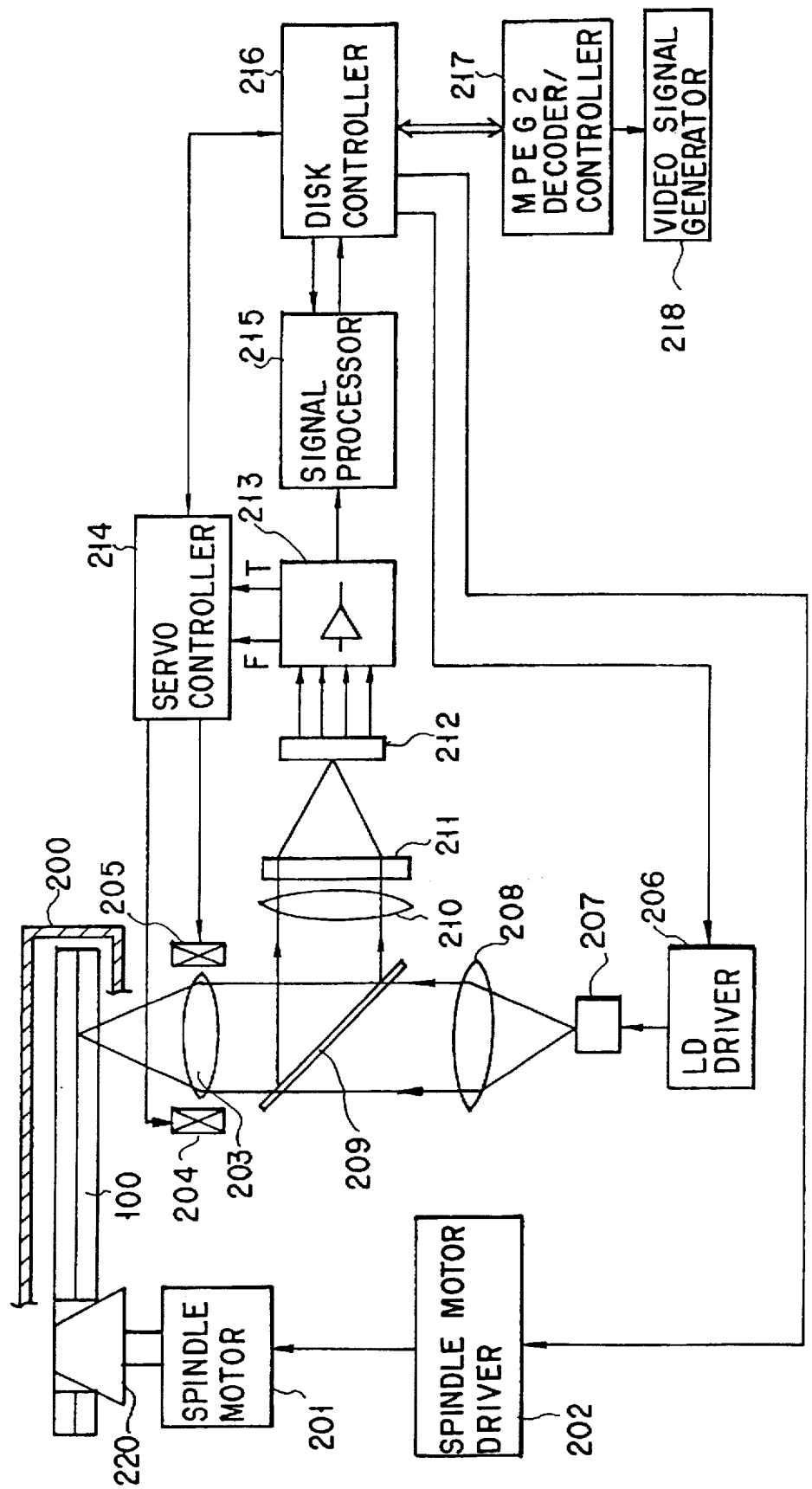
FIG. 17 is a block diagram of an optical disk apparatus according to an embodiment of the present invention.

FIG. 17 shows an example of an optical disk apparatus which reproduces compressed moving-picture information by using the above-mentioned optical disk 100. Because the optical disk 100 uses the substrates 101 and 102 which are as thin as 0.6 mm and consequently are less immune to dust or dirt on their surfaces than a CD using a 1.2-mm thick substrate, the disk 100 is housed in a cartridge 200. By housing the optical disk 100 in the cartridge 200, attention need not be paid to the way of holding the disk, dust, fingerprints, etc. as with CDs, which is helpful in handling and carrying. When the disk is exposed as is a CD, the ability to correct errors must be determined, taking into account an unexpected accident such as a flaw. Use of the cartridge 200, however, makes such a consideration unnecessary. Therefore, it is possible to use the LDC read Solomon error correction technique in sectors as used in a recordable optical disk. As a result of this, for example, when an optical disk is formatted in units of 2 kbyte to 4 kbyte, the recording efficiency can be increased by more than 10% as compared with the CD.

When the 4/9 modulation method is used as a modulation method for the information recorded on the optical disk 100, the track pitch on the optical disk 100 is 0.72 μm, and the pit pitch is 0.96 μm, it is expected that the pit density ratio is 3.84 times as high as the conventional CD format, the modulation efficiency is increased by 20%, and the format efficiency is increased by 10%. Consequently, the capacity can be expected to increase by a total of 5.1 times. As described earlier, when moving-picture information such as a movie is reproduced with a picture quality as high as S-VHS, this requires a rate of 4.5 Mbps including sound, so that the capacity required for two hours of reproduction is 4 Gbyte. Because of the aforementioned capacity increase by 5.1 times, the 4-Gbyte capacity can be realized on one side of the disk. Furthermore, as shown in FIGS. 16A and 16B, a single double-sided optical disk alone enables four hours of recording at a maximum.

In FIG. 17, the optical disk 100 is chucked by a tapered cone 220 which is rotated by a spindle motor 201. The spindle motor 201 is driven by a spindle motor driver circuit 202. The playback optical system is constructed as follows.

An objective lens 203 is placed so as to face the optical disk 100. The objective lens 203 can be moved along the optical axis by a focus coil 204 and across the track width by a tracking coil 205. The wavelength of a laser diode 207 driven by a laser diode (LD) driver 206 is 0.685 μm. The light beam emitted from the laser diode 207 is made into parallel luminous flux by a collimate lens 208 and then enters a polarization beam splitter 209. The light beam emitted from the laser diode 207 has generally an elliptic far field pattern. Therefore, when a round pattern is needed, a beam shaping prism has only to be placed after the collimate lens 208. The light beam passed through the polarization beam splitter 209 is focused by the objective lens 203 onto the optical disk 100.

The light reflected by the reflecting film on the optical disk 100 passes back through the objective lens 203 in the opposite direction to the incident light beam, is reflected by the polarization beam splitter 209, and enters a photosensor 212 via the sensing optical system composed of a condenser lens 210 and a cylindrical lens 211. The photosensor 212 is, for example, a 4-quadrant photosensor. The four sense outputs of the photosensor are input to an amplifier array 213 containing an amplifier and an adder-subtracter, which produces a focus error signal, tracking error signal, and playback signal. The tracking error signal is obtained by, for example, a push-pull technique in the form of a push-pull signal as described earlier. The focus error signal and tracking error signal are supplied to the focus coil 204 and the tracking coil 205 via a servo controller 214. As a result of this, the objective lens 203 is moved along the optical axis and across the track width, thereby focusing the light beam onto the surface of the reflecting film serving as the recording surface of the optical disk 100, and tracking the target track.

The playback signal from the amplifier array 213 is input to a signal processing circuit 215, which binarizes the input and then senses data pulses. The sensed data pulses are inputted to a disk controller 216, which decodes the format, corrects errors, and then supplies the resulting signal as a bit stream of moving-picture information to an MPEG2 decoder/controller 217. Because the data obtained by compressing (encoding) the moving-picture information according to the MPEG2 standards is recorded on the optical disk 100, the MPEG2 decoder/controller 217 expands (decodes) the bit stream input to reproduce the original moving-picture information. The reproduced moving-picture information is supplied to a video signal generator circuit 218, which adds a blanking signal etc. to produce a video signal in a specific television format. The techniques related to MPEG2 have been disclosed in U.S. Pat. No. 5,317,397 and U.S. patent application Ser. No. 08/197,862.

As explained above, the optical disk according to the present invention has such an optimal pit shape (the upper and lower widths of a pit or the upper width of a pit and the angle of the pit's inner wall) as makes it possible to set the track pitch to a smaller value than the spot diameter of the playback light beam and decrease crosstalk between adjacent tracks to a level required for practical use. As a result, with the optical disk, the track density can be made by about 1.5 times as high as the conventional CD and the sufficient levels of the playback signal and the push-pull signal used for tracking can be assured.

Accordingly, with the present invention, as shown in the embodiments described above, the capacity about five times that of the conventional CD can be realized even using the normal CD size, for example. In addition, 4 Mbps of compressed moving-picture information with a picture quality as good as that of a high quality VTR, including sound, can be stored for two hours, which is very useful in practical use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical disk comprising:
   a circular substrate having information recorded thereon with a track pitch, said information being recorded as a plurality of pit trains, each of said pit trains including a plurality of pits; and
   a reflecting layer formed on said substrate, said information being reproduced by projecting a light beam via an objective lens,
   wherein when wavelength of said light beam is $\lambda$ μm and numerical aperture of said objective lens is NA, said track pitch is in the range of $(0.72 \text{ to } 0.8) \times (\lambda/NA)/1.14$ μm, radial tilt is not more than 9.5 mrad, thickness of said substrate is 0.6 mm, and diameter of said circular substrate is 120 mm.

2. An optical disk according to claim 1, further comprising:
- a secondary substrate having secondary information recorded thereon at said track pitch, said secondary information being recorded as a second plurality of pit trains, each of said pit trains including a plurality of pits; and
- a secondary reflecting layer formed on said secondary substrate, said reflecting layer and said secondary reflecting layer being disposed between said substrate and said secondary substrate.

3. An optical disk according to claim 2, further comprising a pair of protective films formed on said reflecting layer and said secondary reflecting layer, respectively, between said reflecting layer and said secondary reflecting layer.

4. An optical disk according to claim 3, further including an adhesion layer formed between said protective films to adhere them to each other.

5. An optical disk apparatus comprising:
- an optical disk including a circular substrate and a reflecting layer formed on said substrate, said substrate having information recorded thereon with a track pitch, said information being recorded as a plurality of pit trains, each of said pit trains including a plurality of pits;
- an objective lens disposed so as to face said optical disk;
- means for projecting a light beam onto said optical disk via said objective lens; and
- means for sensing reflected light of said light beam projected on said optical disk by said projecting means to reproduce said information recorded on said optical disk,
- wherein when wavelength of said light beam is $\lambda$ μm and numerical aperture of said objective lens is NA, said track pitch is in the range of $(0.72 \text{ to } 0.8) \times (\lambda/\text{NA})/1.14$ μm, radial tilt is not more than 9.5 mrad, thickness of said substrate is 0.6 mm, and diameter of said circular substrate is 120 mm.

6. An optical disk apparatus according to claim 5, wherein said sensing means produces a push-pull signal and a playback signal, said push-pull signal representing a difference between signals sensed in at least two areas along a track of said optical disk, and wherein each of said pits has a depth to enable both said push-pull signal and said playback signal to have large levels.

7. An optical disk apparatus according to claim 5, wherein said sensing means has a function of expanding said information compressed according to MPEG2 and recorded on said optical disk according to MPEG2, to reproduce said information.

8. An optical disk comprising:
- a pair of transparent circular substrates with surfaces facing one another, each of said transparent circular substrates having information recorded thereon at a track pitch, said information being defined by a plurality of pit trains, each of said pit trains including a plurality of pits, said information being reproduced by projecting a light beam via an objective lens;
- a pair of reflecting layers coated on said facing surfaces of said pair of circular substrates, respectively;
- a pair of protective layers formed on said pair of reflecting layers, respectively; and
- an adhesive layer formed between said protective layers to adhere said pair of protective layers to one another,
- wherein when wavelength of said light beam is $\lambda$ μm and numerical aperture of said objective lens is NA, said track pitch is between $(0.72 \text{ to } 0.8) \times (\lambda/\text{NA})/1.14$ μm, radial tilt is not more than 9.5 mrad, thickness of each of said substrates is 0.6 mm, and diameter of said circular substrates is 120 mm.

\* \* \* \* \*